United States Patent [19]
Goldsmith

[11] Patent Number: 5,195,040
[45] Date of Patent: Mar. 16, 1993

[54] BACKUP NAVIGATION SYSTEM

[75] Inventor: Martin L. Goldsmith, Placentia, Calif.

[73] Assignee: The United States of America as represented by the Secretary of the Navy, Washington, D.C.

[21] Appl. No.: 503,553

[22] Filed: Mar. 19, 1990

[51] Int. Cl.⁵ .................. G01C 21/00; G05B 9/02; G06F 11/00
[52] U.S. Cl. ............................. 364/443; 364/187; 371/9.1
[58] Field of Search .............. 364/443, 434, 187; 371/9.1

[56] References Cited

U.S. PATENT DOCUMENTS

| | | | |
|---|---|---|---|
| 4,217,486 | 8/1980 | Tawfik et al. | 364/187 |
| 4,622,667 | 11/1986 | Yount | 364/434 |
| 4,644,538 | 2/1987 | Cooper et al. | 364/434 |
| 4,775,976 | 10/1988 | Yokoyama | 364/187 |
| 4,845,495 | 7/1989 | Bollard et al. | 364/434 |

Primary Examiner—Gregory C. Issing
Attorney, Agent, or Firm—John Tarlano

[57] ABSTRACT

A backup navigation system that is failure resistant. The backup navigation system has a multiple member of navigation subsystems. The backup navigation system has the same multiple number of computers. Each computer has the same multiple number of computer processors. Each navigation subsystem is connected to only one computer processor of each computer. Each computer selects data from one of its computer processors in preference to data from any other of its computer processors. Each computer provides a navigation output. Each navigation output is sent into a control navigation computer. One of these navigation outputs is selected by the control navigation computer. A navigation output from one of the computers can also be selectively sent into a navigation interface buffer.

6 Claims, 1 Drawing Sheet

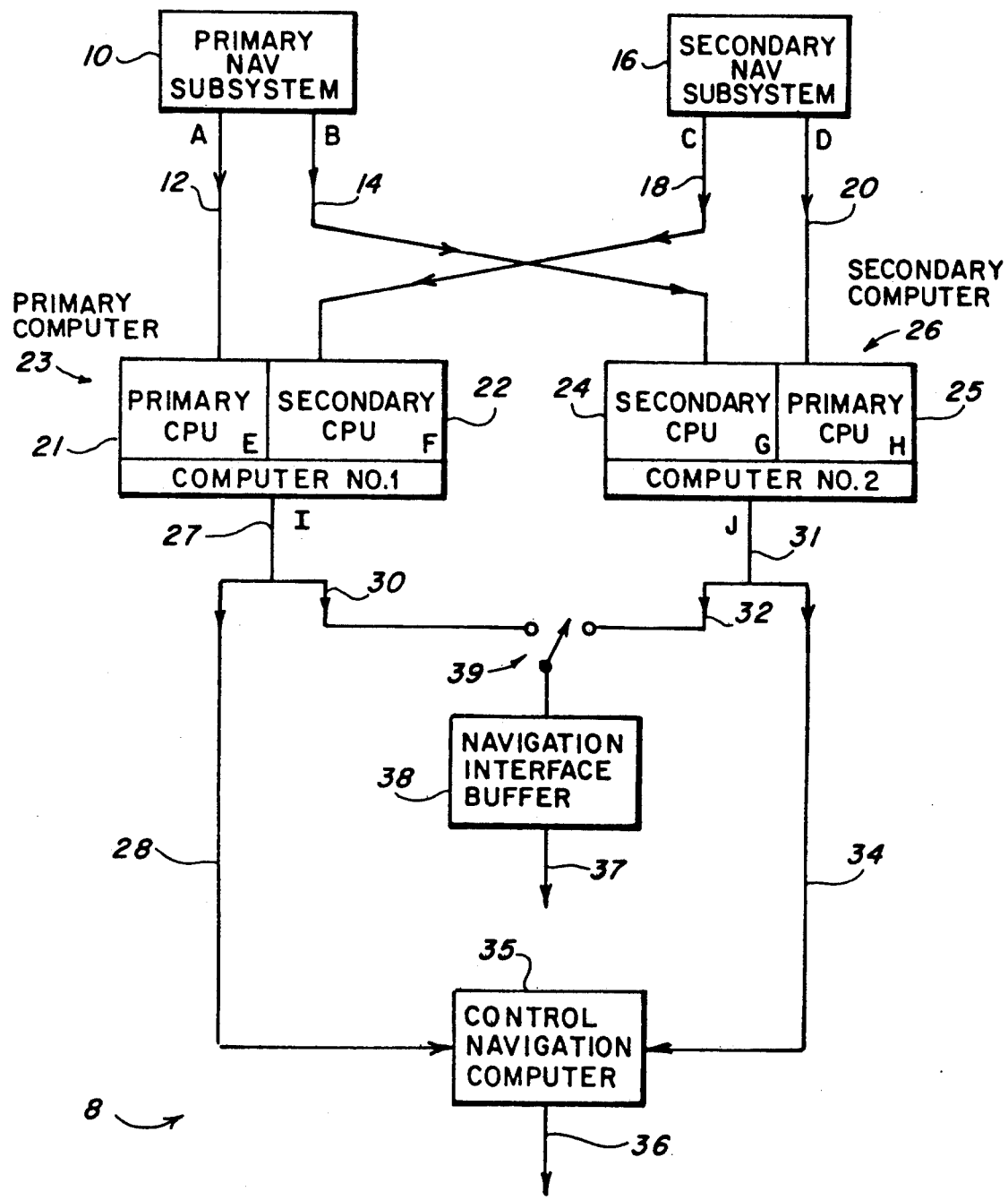
FIGURE 5,195,040

BACKUP NAVIGATION SYSTEM

FIELD OF THE INVENTION

The backup navigation system of the present invention relates to a failure resistant navigation system for a vehicle.

BACKGROUND OF THE INVENTION

Various types of computer backup systems have been proposed. However they do not have sufficient redundancy therein.

The backup navigation system of the present invention is a failure resistant navigation system for a vehicle. The backup navigation system includes a multiple number of navigation subsystems and at least one computer. The computer has a multiple number of computer processors. Each processor processes information from a different navigation subsystem. The computer sends processed navigation information to the vehicle. The backup navigation system is failure resistant since it has navigation subsystem redundancy and computer processor redundancy therein.

The present invention contemplates a multiple number of navigation subsystems and a multiple number of computer processors, known as a set of computer processors, in a computer. One of the computer processors of the set of computer processors processes navigation information from each navigation subsystem. The computer sends processed navigation information to a vehicle. Each processor of the set of processors has a computer program therein. All of the computer programs are substantially the same.

The invention further contemplates the use of a multiple number of computers, each computer having a multiple number of computer processors therein. Each computer would have a sufficient number of computer processors, in order to process navigation information from the various navigation subsystems. Each computer would send processed navigation information to the vehicle.

There is both navigation subsystem redundancy and computer processor redundancy in the backup navigation system. Navigation subsystem redundancy is used so that should one navigation subsystem fail, the other navigation subsystem will supply navigation information to a computer. Computer processor redundancy is used so that should one computer processor in a computer fail, another computer processor in the computer will process navigation information from a navigation subsystem.

The invention also contemplates automatic switching within a terminal unit. The output of each computer is sent into the terminal unit. The switching is between outputs of the computers. If one of the computer goes down, information from another computer is automatically switched to and used.

There may be several terminal units, each of which accepts the several computer outputs. One such terminal unit is a central navigation computer unit and another terminal unit is a navigation interface buffer unit. The central navigation computer unit would have automatic switching between and among the computer outputs going to it. The switching between and among computers going to the navigation interface buffer unit is contemplating as being manual switching.

DESCRIPTION OF THE DRAWING

The figure is a block diagram of the backup navigation system of the present invention.

DESCRIPTION OF THE PREFERRED EMBODIMENT

The figure shows a backup navigation system 8. The navigation system 8 has a primary navigation subsystem 10. The navigation subsystem 10 has two identical outputs, each of which carries the same navigation information. The navigation information relates to maneuvers of a vehicle, on which the backup navigation system 8 is located. The outputs from subsystem 10 are carried over lines 12 and 14.

The backup navigation system 8 also has a secondary navigation subsystem 16. Two identical outputs from subsystem 16 are carried over lines 18 and 20. One of the two navigation subsystems, that is either 10 or 16, is chosen to function as a primary navigation subsystem and the other navigation subsystem is made to function as a secondary navigation subsystem. Their chosen roles can be reversed since the two navigation subsystems 10 and 16 are identical.

Outputs of navigation information from the two navigation subsystems 10 and 16 are designated as A over line 12, B over line 14, C over line 18 and D over line 20.

A set of two computer processors 21 and 22 are located in a computer 23. A set of two computer processors 24 and 25 are located in a computer 26. Computer processors 21 and 22 process information A and C from navigation subsystems 10 and 16. Computer processors 24 and 25 process information B and D from navigation subsystems 10 and 16.

Processed navigation information A, coming from navigation subsystem 10, is outputted from computer processor 21 as data E into computer 23. Processed navigation information C, coming from navigation subsystem 16, is simultaneously outputted from computer processor 22 as data F into computer 23. Processed navigation information B, coming from navigation subsystem 10, is outputted from computer processor 24 as data G into computer 26. Processed navigation information D, coming from navigation subsystem 16, is outputted from computer processor 25 as data H into computer 26.

The computer 23 will output data E in preference to data F. The computer 26 will output data G in preference to data H. The output of computer 23 is designated as data I and is carried on line 27. Line 27 branches into lines 28 and 30. The output of computer 26 is designated as data J and is carried on line 31. Line 31 branches into lines 32 and 34.

The outputs on lines 28 and 34 go to central navigation computer 35. The computer 35 has automatic switching in it. The computer 35 initially selects data I to be outputted on line 36. If computer 23 fails, computer 35 would automatically put signal J out on line 36. Signal I is contemplated as being the primary signal while signal J is the secondary signal. The output of computer 35 would be carried on line 36 to a fire control system.

If navigation subsystem 10 alone fails, navigation information would continue to be an output from computers 23 and 26, computers 23 and 26 would output processed navigation information from navigation system 16. If navigation subsystem 16 alone fails, navigation information would continue to be an output from computer 23 and 26, computers 23 and 26 would output processed navigation information from navigation subsystem 10.

If computer 23 alone fails, navigation information will be carried to computer 35 on line 34, from navigation subsystem 16 and computer 26. If computer 26 alone fails, navigation will be carried to computer 35 on line 28, from navigation subsystem 10 and computer 23.

If navigation subsystem 10 and computer 23 both fail, processed navigation information would come over line 34 from navigation subsystem 16 and computer 26. If navigation subsystem 10 and computer 26 both fail, processed navigation information would come over line 28 from navigation subsystem 16 and computer 23. If navigation subsystem 16 and computer 23 both fail, processed navigation information would come over line 34 from navigation subsystem 10 and computer 26. If navigation subsystem 16 and computer 26 both fail, processed navigation information would come over line 28 from navigation subsystem 10 and computer 23.

The outputs on lines 30 and 32 could be sent to a navigation interface buffer 38, and then to line 37. Line 37 is connected with line 36. The buffer 38 has a manual switch 39. The switch 39 ma be placed either in contact with line 30 from computer 23 or in contact with line 32 from computer 26.

If computer 35 alone fails, buffer 38 could be connected to the output on line 30 or the output on line 32. If computer 23 fails as well as computer 35, the buffer 38 could be switched to line 32. If computer 26 fails as well as computer 35, the buffer 38 could be switched to line 30.

Automatic switching within control navigation computer 35 could be accomplished by use of automatic switch means. Such an automatic switching means is known in the art.

While the present invention has been disclosed in connection with the preferred embodiment thereof, it should be understood that there may be other embodiments which fall within the spirit and scope of the invention as defined by the following claims.

What is claimed is:

1. A backup navigation system for use on a vehicle, comprising:
   (a) two navigation subsystems on the vehicle, each navigation subsystem having two outputs;
   (b) two computers, each computer having two computer processors, each computer processor having an input, each said computer having a branched output, each navigation subsystem being connected to only one computer processor of each computer, each computer selecting data from one of its processors in preference to data from another of its processors to provide processed navigation information of the vehicle through its branched output;
   (c) a first terminal unit having inputs, a branched output of each said computer being connected to each input, for receiving processed navigation information and for automatically switching from an unenergized branched output of one computer to an energized branched output of another computer; and
   (d) a second terminal unit having inputs, a branched output of each said computer being connected to each input, for receiving processed navigation information and for manually switching from an unenergized branched output of one computer to an energized branched output of another computer.

2. A backup navigation system for use on a vehicle comprising:
   (a) a first plurality of navigation subsystems on the vehicle, each navigation subsystem having a second plurality of outputs, the second plurality being equal to the first plurality; and
   (b) a third plurality of computers, said third plurality being equal to said second plurality, each computer having a fourth plurality of computer processors, the fourth plurality being equal to said first plurality, each computer processor having an input, each said computer having an output, each navigation subsystem being connected to only one computer processor of each computer, each computer selecting data from one of its processors in preference to data from any other of its processors to provide processed navigation information of the vehicle through its output.

3. A backup navigation system for use on a vehicle, comprising:
   (a) two navigation subsystems on the vehicle, each navigation subsystem having two outputs; and
   (b) two computers, each computer having two computer processors, each computer processor having an input, each said computer having an output, each navigation subsystem being connected to only one computer processor of each computer, each computer selecting data from one of its processors in preference to data from another of its processors to provide processed navigation information of the vehicle through its output.

4. A backup navigation system for use on a vehicle, comprising:
   (a) a first plurality of navigation subsystems on the vehicle, each navigation subsystem having a second plurality of outputs, the second plurality being equal to the first plurality;
   (b) a third plurality of computers, said third plurality being equal to said second plurality, each computer having a fourth plurality of computer processors, the fourth plurality being equal to said first plurality, each computer processor having an input, each computer having an output, each navigation subsystem being connected to only one computer processor of each computer, each computer selecting data from one of its processors in preference to data from any other of its processors to provide processed navigation information of the vehicle through its output; and
   (c) a terminal unit having inputs, an output of each said computer being connected to each input, for receiving processed navigation information and for automatically switching from an unenergized output of one computer to an energized output of another computer.

5. A backup navigation system for use on a vehicle, comprising:
   (a) two navigation subsystems on the vehicle, each navigation subsystem having two outputs;
   (b) two computers, each computer having two computer processors, each computer processor having an input, each said computer having an output, each navigation subsystem being connected to only one computer processor of each computer, each computer selecting data from one of its processors in preference to data from another of its processors to provide processed navigation information of the vehicle through its output; and (c) a terminal unit having inputs, an output of each said computer being connected to each input, for receiving processed navigation information and for automatically switching from an unenergized output of one computer to an energized output of another computer.

6. A backup navigation system for use on a vehicle, comprising:

(a) a first plurality of navigation subsystems on the vehicle, each navigation subsystem having a second plurality of outputs, the second plurality being equal to the first plurality;

(b) a third plurality of computers, said third plurality being equal to said second plurality, each computer having a fourth plurality of computer processors, the fourth plurality being equal to said first plurality, each computer processor having an input, each computer having a branched output, each navigation subsystem being connected to only one computer processor of each computer, each computer selecting data from one of its processors in preference to data from any other of its processors to provide processed navigation information of the vehicle through its branched output;

(c) a first terminal unit having inputs, a branched output of each said computer being connected to each input, for receiving processed navigation information and for automatically switching from an unenergized branched output of one computer to an energized branched output of another computer; and (d) a second terminal unit having inputs, a branched output of each said computer being connected to each input, for receiving processed navigation information and for manually switching from an unenergized branched output of one computer to an energized branched output of another computer.

* * * * *